United States Patent
Ishii et al.

(10) Patent No.: US 7,567,490 B2
(45) Date of Patent: Jul. 28, 2009

(54) OPTICAL DISK RECORDING METHOD AND AN OPTICAL DISK APPARATUS

(75) Inventors: Toshiki Ishii, Tokyo (JP); Tsuyoshi Toda, Kodaira (JP)

(73) Assignees: Hitachi, Ltd., Tokyo (JP); Hitachi - LG Data Storage, Inc, Tokyo (JP)

( * ) Notice: Subject to any disclaimer, the term of this patent is extended or adjusted under 35 U.S.C. 154(b) by 671 days.

(21) Appl. No.: 11/290,510

(22) Filed: Dec. 1, 2005

(65) Prior Publication Data
US 2006/0280090 A1   Dec. 14, 2006

(30) Foreign Application Priority Data
May 30, 2005   (JP)   .............................. 2005-156579

(51) Int. Cl.
G11B 5/09   (2006.01)
(52) U.S. Cl. ................... 369/59.11; 369/59.1; 369/47.5
(58) Field of Classification Search ........................ None
See application file for complete search history.

(56) References Cited

U.S. PATENT DOCUMENTS 6,842,412 B2 *   1/2005   Ushiyama et al. ........ 369/47.53

2003/0043711 A1   3/2003   Mashimo et al.

FOREIGN PATENT DOCUMENTS

| CN | 1407541 A | 4/2003 |
|---|---|---|
| JP | 05-225570 | 9/1993 |
| JP | 2004-086999 | 3/2004 |

* cited by examiner

*Primary Examiner*—Muhammad N. Edun
(74) *Attorney, Agent, or Firm*—Antonelli, Terry, Stout & Kraus, LLP.

(57) ABSTRACT

In a CAV recording of an optical disk, when a plurality of zones are provided, a write strategy is matched for a change in recording linear velocity in the zone so that recording quality can be assured, and recording power is controlled. The write strategy (pulse timing and power ratio) is optimized at the highest recording linear velocity of each zone and the setting of the power in each zone is controlled so that a relation between a recording linear velocity V and a recording power Po satisfies Po=CV (C is a coefficient which is obtained from the relation between Po and V at a zone end point), thereby assuring the reliability of recorded information.

6 Claims, 10 Drawing Sheets

FIG. 9A
RECORDING LINEAR VELOCITY V1

FIG. 9B
RECORDING LINEAR VELOCITY V2

OPTICAL DISK RECORDING METHOD AND AN OPTICAL DISK APPARATUS

INCORPORATION BY REFERENCE

The present application claims priority from Japanese application JP2005-156579 filed on May 30, 2005, the content of which is hereby incorporated by reference into this application.

BACKGROUND OF THE INVENTION

1. Field of the Invention

The present invention relates to a technique for recording information on an optical disk by irradiating a laser beam.

2. Description of the Related Art

An optical disk such as CD, DVD, or the like is used as a recording medium of data such as computer data, audio/visual data, or the like.

The data recording on the optical disk is performed by irradiating a laser beam converged by a lens on a recording surface of the optical disk and forming marks and spaces. A laser light emission waveform according to a length of recording mark is used to record the mark. The laser light emission waveform is called write strategy. The write strategy is constructed by: pulse timing which specifies a rising edge, a falling edge, and a recording pulse width of the laser beam; and recording power which specifies laser power.

As a deciding method of the pulse timing at an arbitrary recording linear velocity in the write strategy, there is a deciding method disclosed in JP-A-2004-86999. The pulse timing at an arbitrary recording linear velocity is obtained from the pulse timing at two recording linear velocities by linear interpolation. As a deciding method of the pulse timing in the case where the linear interpolation is not used, there is a method of adjusting parameters so that recording quality can be assured at recording linear velocities at both ends of each zone.

As a setting method of the recording power at an arbitrary recording linear velocity in the write strategy, there is a deciding method disclosed in JP-A-5-225570. According to such a method, the optimum recording power at two or more recording linear velocities is obtained and the recording power is changed by the linear interpolation or the like at a recording velocity between the two recording linear velocities.

SUMMARY OF THE INVENTION

Figure 1:
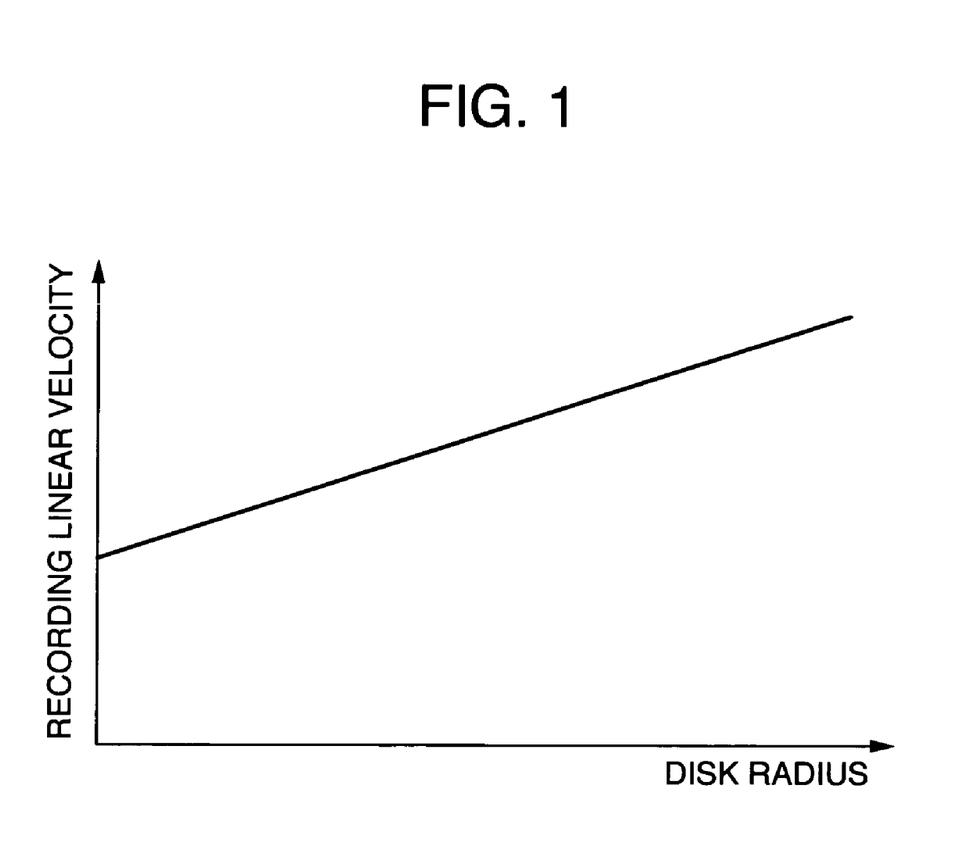
FIG. 1 shows a relation between a disk radius and a recording linear velocity in the CAV recording.

As a recording method of realizing the high-speed recording on a recording type optical disk, a CAV (Constant Angular Velocity) method shown in FIG. 1 has been known. By rotating the optical disk at a predetermined rotational speed in a region from an inner periphery to an outer periphery, the recording linear velocity increases as a recording position approaches the outer periphery as shown in FIG. 1.

When the recording linear velocity changes, it is necessary to correct the write strategy. In the CAV recording, since the recording linear velocity continuously changes as shown in FIG. 1, it is desirable to also continuously change the write strategy. However, when the pulse timing is changed, since it is necessary to temporarily stop the recording due to restriction of a function of a laser driver to drive the laser, the pulse timing cannot be continuously changed in accordance with the continuous change in the recording linear velocity. Therefore, hitherto, a plurality of concentric zones are specified on the optical disk, the recording is executed in each zone by using the fixed write strategy which has been set every mark length, and the write strategy is updated upon switching of the zones.

If a width of each zone is reduced, a change between the recording linear velocities in the innermost periphery and the outermost periphery of each zone can be reduced and a difference between the optimum write strategies to each recording linear velocity decreases. Therefore, since the write strategy near both of the optimum write strategy in the innermost periphery and the optimum write strategy in the outermost periphery can be set as a write strategy of the relevant zone, the recording based on the preferred write strategy can be executed in any position of the zone. However, the decrease in width of each zone results in an increase in the number of zones and there is such a problem that the number of zone switching times, that is, the number of times of "temporary stop of the recording" and the number of times of "write strategy updating" increase, so that a time which is required until completion of the recording increases.

If the number of zones is simply decreased in order to shorten the recording time, in each zone, the difference between the recording linear velocity in the innermost periphery and that in the outermost periphery increases. That is, the difference between the optimum write strategies to both of the recording linear velocities decreases in the innermost periphery and the outermost periphery increases. There is, consequently, such a problem that in the fixed write strategy which has been set for the relevant zone, it is difficult to keep recording quality at both of the recording linear velocities in the innermost periphery and the outermost periphery.

According to the foregoing related art, in the case of using the linear interpolation for the decision of the write strategy in the CAV recording, it is not explained which one of the recording linear velocities in the zone should be used to decide the write strategy to be set for the relevant zone.

Also in the case of deciding the write strategy of each zone without using the linear interpolation, it is not explained which one of the recording linear velocities in the zone should be used to optimize the write strategy.

Further, in the case where a plurality of zones are provided, since it is necessary to obtain the optimum powers of the number corresponding to the number of zones, a work amount for development of the write strategy increases and developing time also becomes long. When the data is actually written on the optical disk as well, such a problem that write strategy adjusting time becomes long and a trial writing region is wastefully consumed or the like occurs.

The present invention is made in consideration of the problems as mentioned above and it is an object of the invention to provide an optical disk recording method and an optical disk apparatus which can shorten the write strategy developing time and the write strategy adjusting time and prevent the wasteful consumption of the trial writing region.

To accomplish the above object, according to the invention, the write strategy (pulse timing and power ratio) is optimized by the highest recording linear velocity of each zone.

The reliability of information is assured by controlling the setting of the power in each zone so that a relation between a recording linear velocity V and a recording power Po is set to Po=CV (C is a coefficient which is obtained from the relation between Po and V at a zone end point).

According to the invention, the reliability of reproduction data from the optical disk can be improved.

Other objects, features and advantages of the invention will become apparent from the following description of the embodiments of the invention taken in conjunction with the accompanying drawings.

DETAILED DESCRIPTION OF THE EMBODIMENTS

An embodiment of the invention will be described hereinbelow with reference to the drawings.

Although a castle type write strategy which is used for recording of a DVD-R will be explained here as an example, the invention can be also applied to other optical disks such as CD-R, CD-RW, DVD–R, DVD+R, DVD–RW, DVD+RW, DVD-RAM, and the like and other write strategies.

Figure 3:
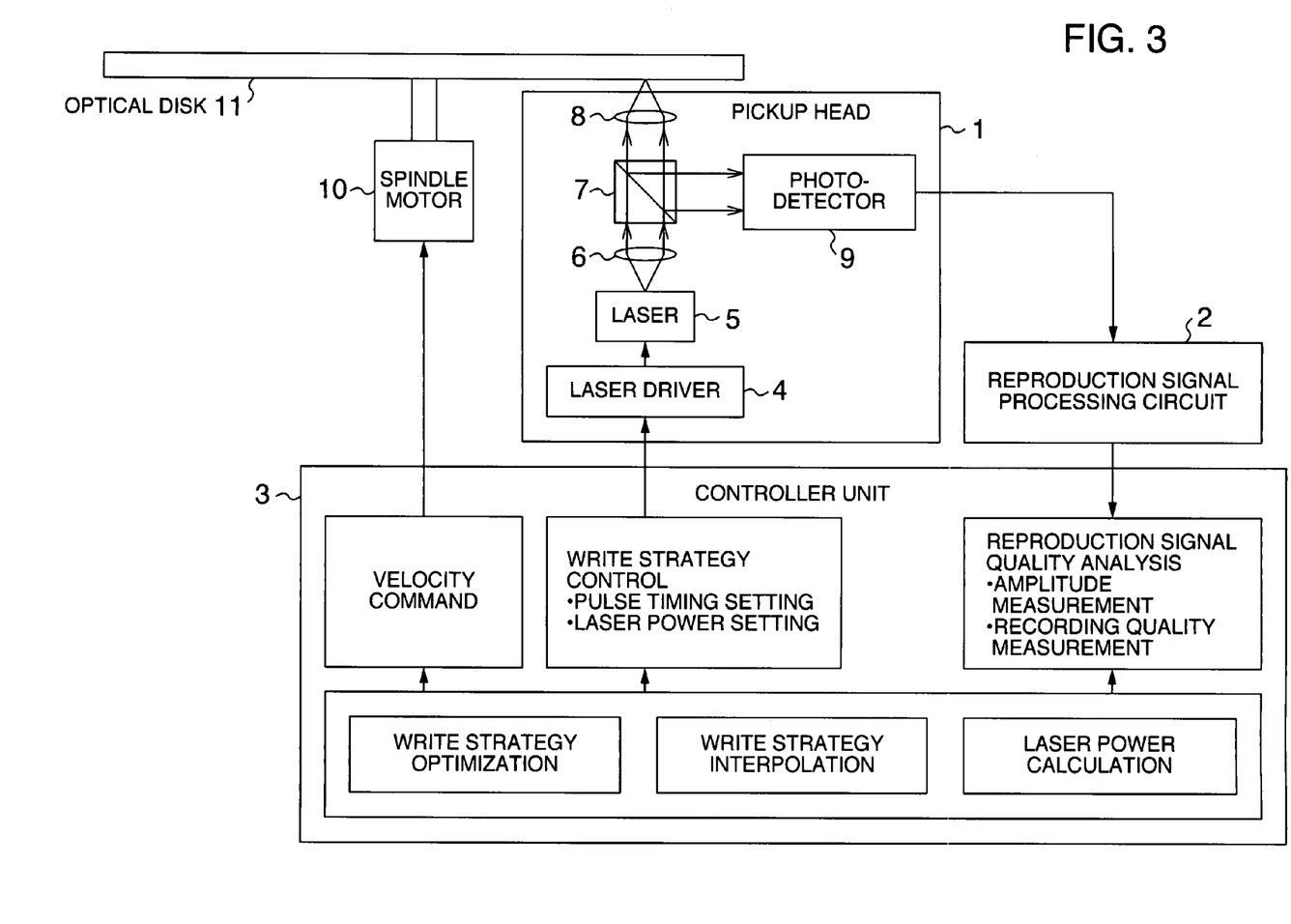
FIG. 3 shows a system construction.

First, an optical disk apparatus will be described. FIG. 3 is a block diagram showing a construction of the optical disk apparatus of the invention. Reference numeral 1 denotes a pickup head for performing light emission and light reception of a laser beam; 2 a reproduction signal processing circuit for generating a reproduction signal such as reproduction waveform, servo signal, or the like from a received photosignal; and 3 a controller unit for processing the reproduction signal and performing driving of a servo and decoding, modulation, or the like of recording data. A laser driver 4 is mounted on the pickup head 1. The laser driver 4 modulates a modulation signal from the controller unit 3 into a write strategy and drives a laser 5 so as to emit a laser beam therefrom. The laser beam is converted into parallel light by a collimator lens 6. The laser beam which passed through a prism 7 is converged on a recording surface of a disk 11, so that a mark is formed and data is recorded. Upon reproduction, reflection light is guided to a photodetector 9 by the prism 7. The light detected by the photodetector 9 is converted into an electric signal and sent to the reproduction signal processing circuit 2. Reference numeral 10 denotes a spindle motor to rotate the optical disk 11.

In the reproduction signal processing circuit 2, waveform equalization, data slice, and PLL (Phase Locked Loop) are performed on the basis of the signal sent from the pickup head 1, so that binary data and clocks are generated. Servo signals such as tracking error signal and focusing error signal are also generated. Those signals are sent to the controller unit 3.

Upon reproduction, in the controller unit 3, the data is decoded on the basis of the binary signal sent from the reproduction signal processing circuit. In this instance, quality such as a jitter or the like of the reproduction signal is evaluated. Amplitude information is calculated from the reproduction waveform in order to discriminate whether or not the laser power is proper. On the basis of those information, a discrimination about permission or inhibition of the recording, optimization of the write strategy, and the like are performed. Upon recording, in the controller unit 3, the data is modulated and the modulation data is sent to the laser driver 4.

Figure 4:
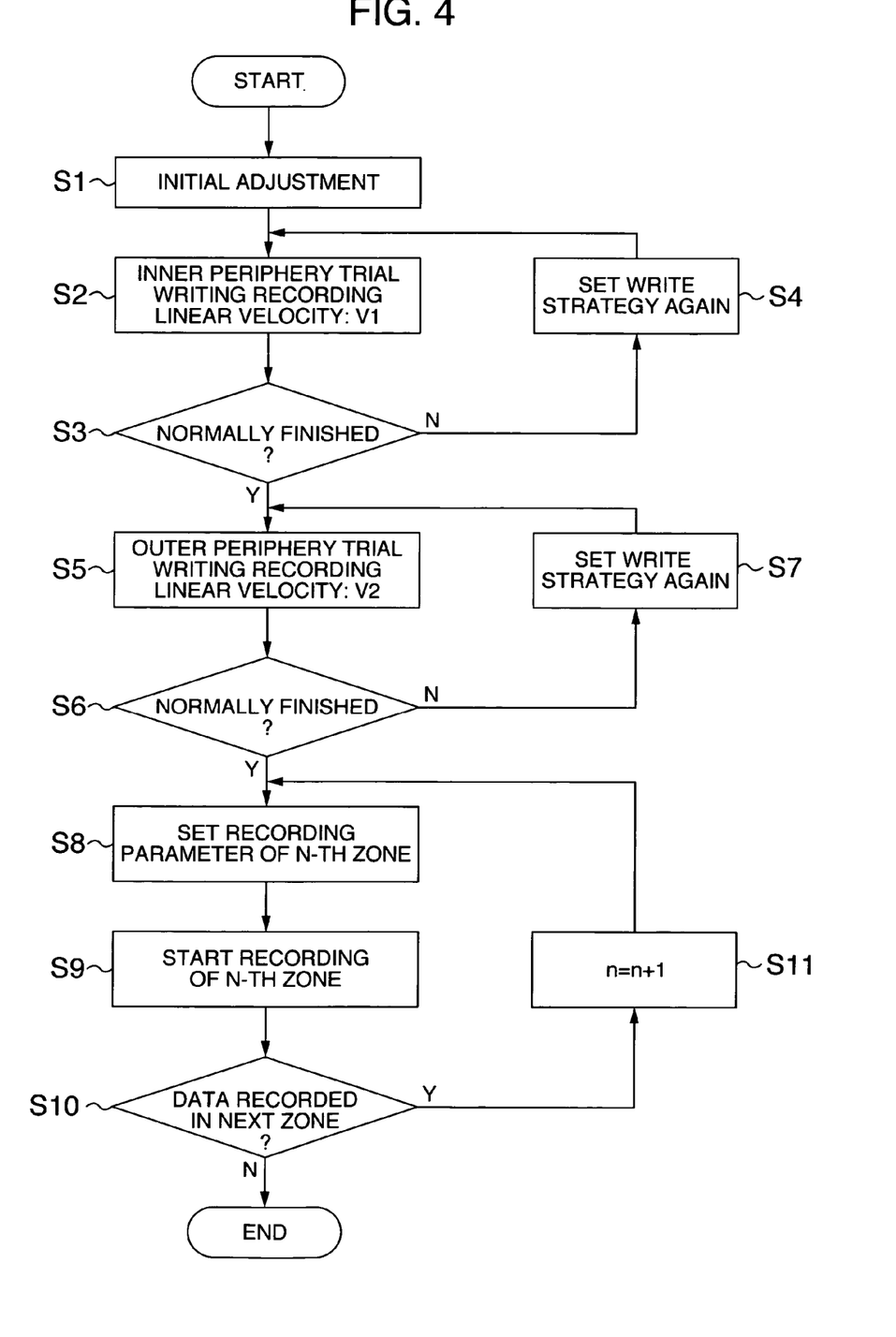
FIG. 4 shows a write strategy setting processing flow on a drive.

A processing flow in the actual optical disk apparatus will be described. When the disk is loaded into the optical disk apparatus by the user, in the drive, initial adjustment (step S1) such as adjustment of servo conditions, discrimination of the disk, reading of the disk information, and the like is made.

After that, when a recording command is sent from a host computer, recording conditions are optimized prior to recording of a user area. First, an inner periphery trial writing S2 is executed at a recording linear velocity V1 which is used in an inner periphery trial writing zone. The write strategy at the lowest recording linear velocity V1 as a recording linear velocity on the inner periphery side corresponding to the disk is selected from the read disk information.

Figure 2:
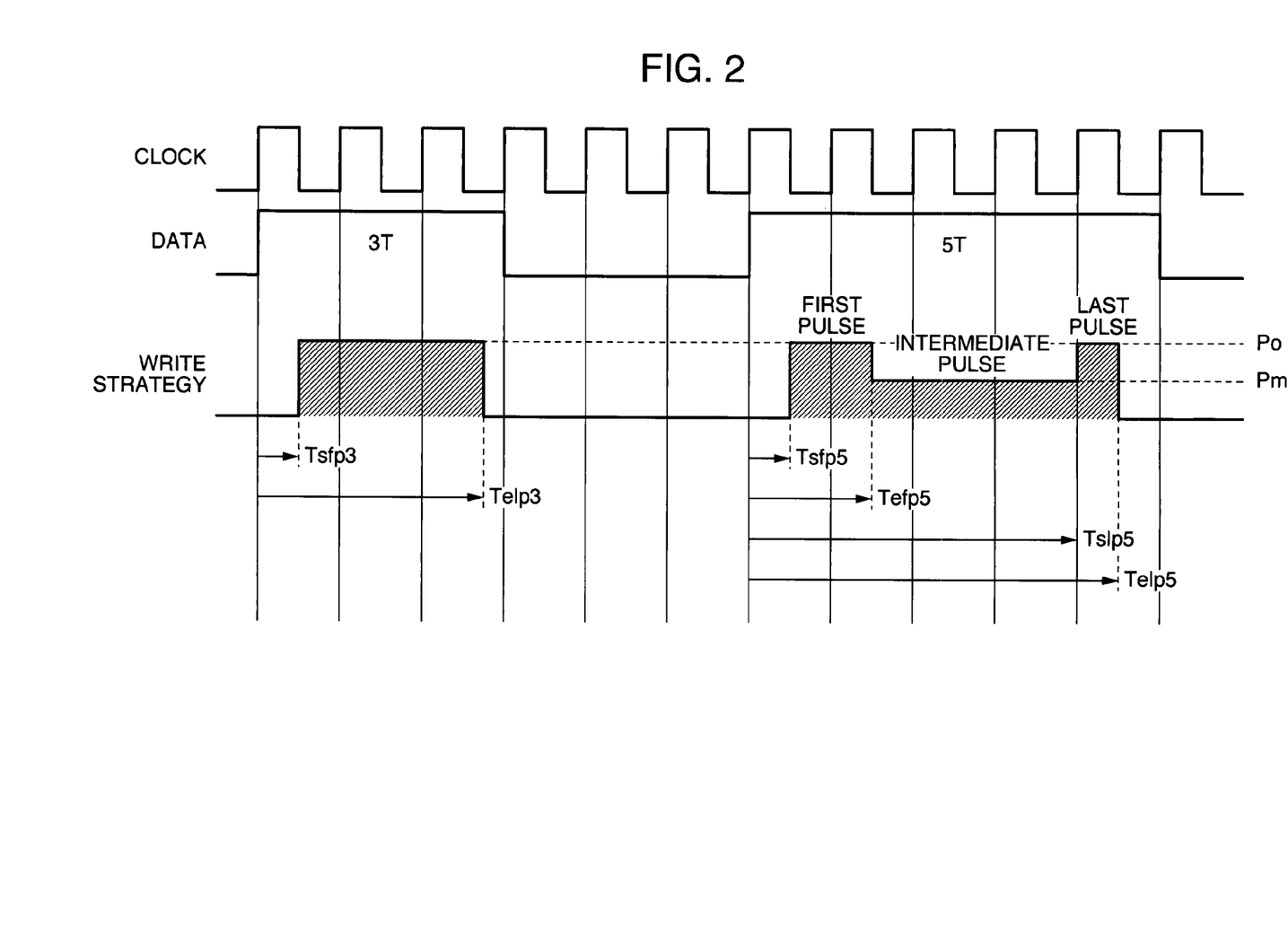
FIG. 2 shows a castle type write strategy.

The castle type write strategy will now be specifically explained as an example with reference to FIG. 2. As mentioned above, the write strategy is constructed by the recording power and the pulse timing. It is now assumed that recording power of each of a first pulse and a last pulse is called Po, a recording power of an intermediate pulse is called Pm, and a ratio Po/Pm of Po and Pm is called a PoPm ratio. Sets of pulse timing of rising edges (Tsfp3, Tsfp5, and Tslp5 in FIG. 2) and that of falling edges (Telp3, Tefp5, and Telp5 in FIG. 2) of each pulse are assumed to be Tset, respectively. Although an example of a 3T mark and a 5T mark is shown in FIG. 2 (T denotes channel bits), the pulse timing and the recording powers are set with respect to each of 3T to 11T marks and a 14T mark existing in the DVD standard.

Those write strategy information is set into the laser driver 4. The pickup head 1 is moved to the inner periphery trial writing region by a feed motor (not shown). In the inner periphery trial writing region, the trial writing is executed while changing, for example, the recording power or the pulse timing.

Subsequently, the recorded signal is evaluated (S3). As an evaluation, besides the evaluation based on the jitter, an evaluation based on beta may be performed. The recorded signal is reproduced and the amplitude information, recording quality, and the like of the recording mark are evaluated in the controller unit 3. When the amplitude information and recording quality do not satisfy target conditions, resetting of the write strategy is made (S4) and the recording (S2) and evaluation (S3) are executed again. Recording powers of the write strategies in the innermost periphery zone obtained as mentioned above are assumed to be Po1 and Pm1 and a pulse timing set is labeled as Tset1.

After completion of the write strategy adjustment in the inner periphery, the write strategy at the highest recording linear velocity V2 which is used in the outer periphery trial writing zone is selected and set into the laser driver 4. The pickup head 1 is moved to the outer periphery trial writing region by the feed motor. In the outer periphery, trial writing (S5) and evaluation (S6) of the recording quality are also executed in a manner similar to the operation in the inner periphery as mentioned above and the write strategy is adjusted. If the amplitude information and the recording quality do not satisfy the target conditions, resetting of the write strategy is made (S7) and the recording (S5) and evaluation (S6) are executed again. Recording powers of the write strategies in the outermost periphery zone obtained as mentioned above are assumed to be Po2 and Pm2 and a pulse timing set is labeled as Tset2.

Figure 5A:
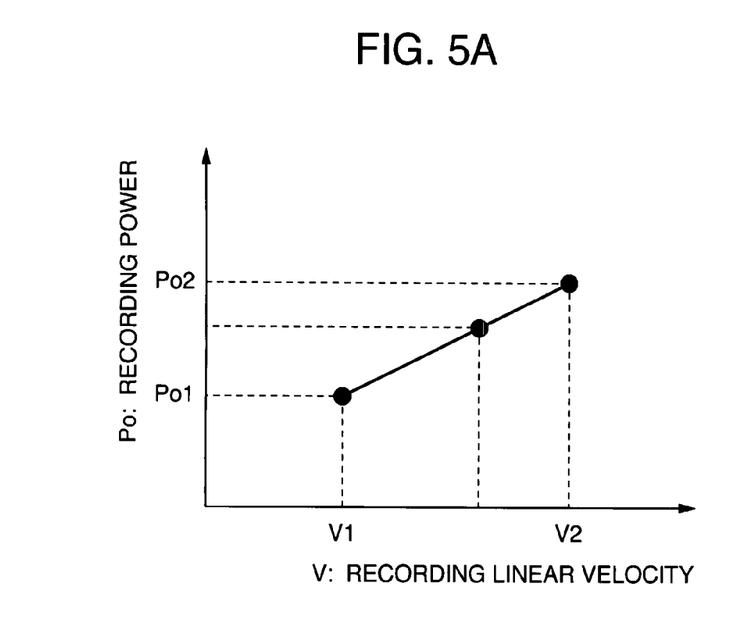
FIGS. 5A and 5B are diagrams for explaining a linear interpolating method of the write strategy.
Figure 5B:
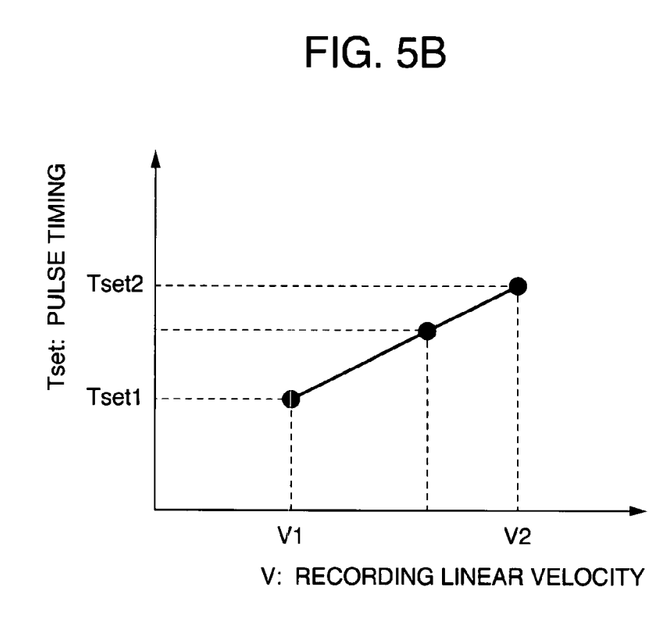

Subsequently, the write strategy in the n-th zone (n: initial value 1) among a plurality of concentric zones specified on the optical disk is set (S8). An example of forming the write strategy of the intermediate zone by linear interpolation will now be described. A method of the linear interpolation is shown in FIGS. 5A and 5B. The recording powers Po and Pm at an arbitrary recording linear velocity V and the pulse timing Tset are obtained by the following Equations (1) to (3), respectively.

$$Po = \frac{Po2 - Po1}{V2 - V1} \times V + \frac{Po1 \times V2 - Po2 \times V1}{V2 - V1} \quad (1)$$

$$Pm = \frac{Pm2 - Pm1}{V2 - V1} \times V + \frac{Pm1 \times V2 - Pm2 \times V1}{V2 - V1} \quad (2)$$

$$Tset = \frac{Tset2 - Tset1}{V2 - V1} \times V + \frac{Tset1 \times V2 - Tset2 \times V1}{V2 - V1} \quad (3)$$

Figure 6:
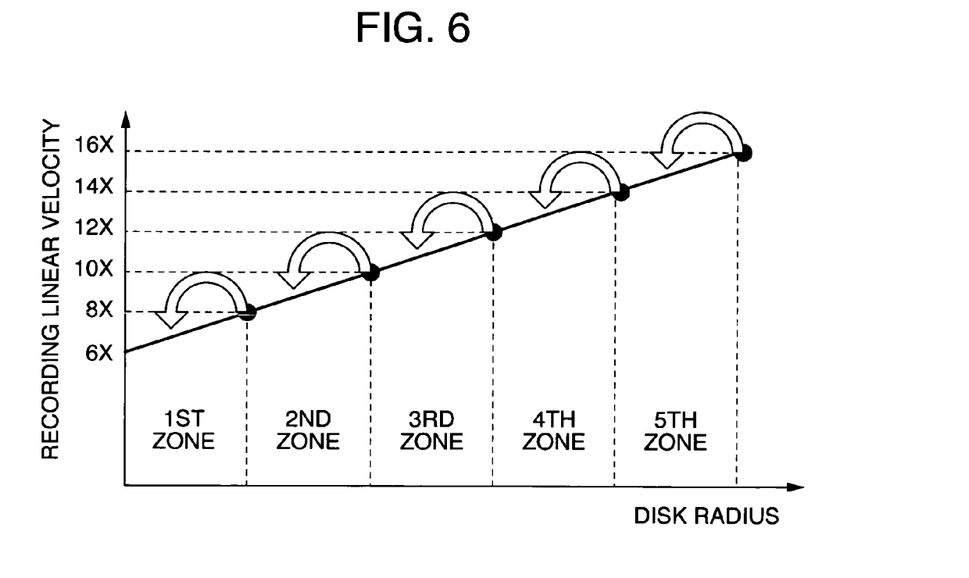
FIG. 6 shows a recording linear velocity for setting the write strategy in each zone.

The write strategy which is set for each zone is decided by substituting the highest recording linear velocity into Equations (1) to (3). A state of obtaining the write strategy at the highest recording linear velocity in each zone is shown in a schematic diagram of FIG. 6. For example, as zones to divide the recording linear velocity every 2X, the zones are divided into the zones 6X-8X, 8X-10X, 10X-12X, 12X -14X, and 14X-16X from the inner periphery of the disk. In the zone of 14X-16X, the calculation is executed by regarding V as 16X as a highest recording linear velocity of the zone and the PoPm ratio and Tset are obtained.

Figure 7:
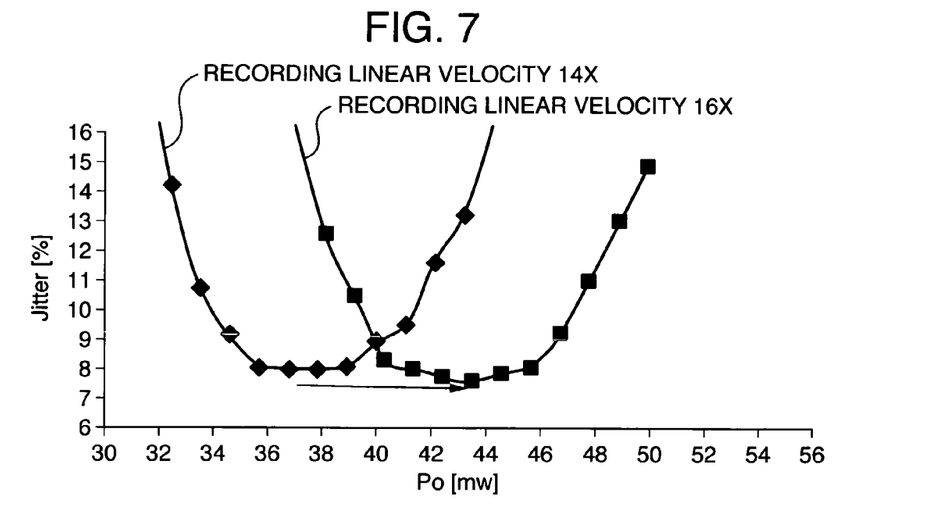
FIG. 7 shows a relation between a power and a jitter in the case where the write strategy is matched by a zone high linear velocity.
Figure 8:
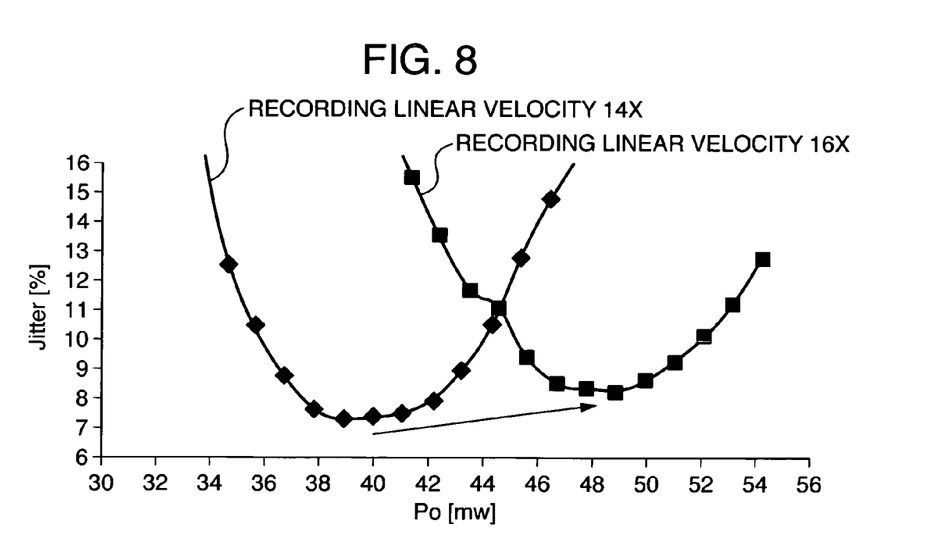
FIG. 8 shows a relation between the power and the jitter in the case where the write strategy is matched by a zone low linear velocity.

In the zone of 14X-16X, power margins of the jitter when the recording is executed at 14X and 16X by using the write strategy adjusted by 16X (high velocity) are shown in FIG. 7. Power margins of the jitter when the recording is executed at 14X and 16X by using the write strategy adjusted by 14X (low velocity) are shown in FIG. 8.

As shown in FIG. 7, when the write strategy is matched by the highest recording linear velocity of the zone, the bottom jitter of 14X is equal to 7.9% and that of 16X is equal to 7.6%. Thus, almost equal recording quality can be assured at both of the linear velocities. As shown in FIG. 8, when the write strategy is matched by the lowest recording linear velocity of the zone, the bottom jitter of 14X is equal to 7.3% and that of 16X is equal to 8.2%. It will be understood that although the recording quality is high on the low recording linear velocity side, the recording quality deteriorates on the high recording linear velocity side.

This is because since the conditions of the servo control and the laser control become severer in accordance with an increase in recording linear velocity, an amount of jitter components which cannot be suppressed increases. Therefore, by matching the write strategy by the highest recording linear velocity, even if shift components are generated on the low recording linear velocity side, the amount of jitter components decreases, so that average performance is obtained. As mentioned above, the recording quality in each zone can be assured by the write strategy obtained by substituting the highest recording linear velocity of each zone into Equations (1) to (3).

Subsequently, the obtained write strategy is set into the laser driver 4 and the recording is started (S9).

Figure 9A:
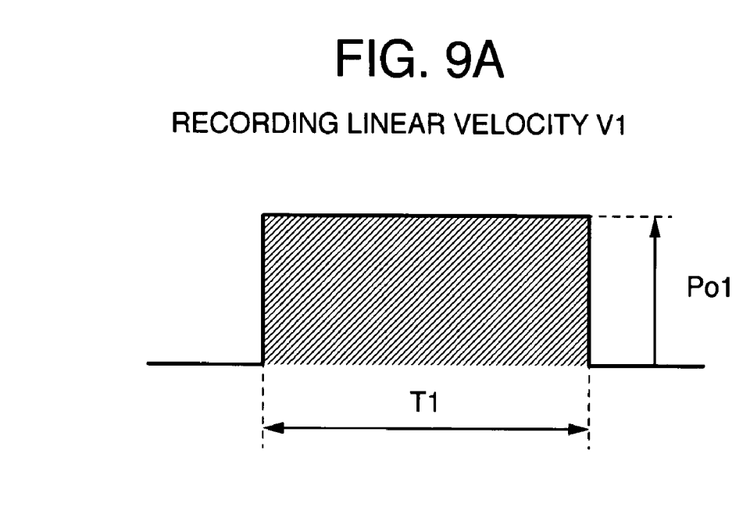
FIGS. 9A and 9B waveforms showing a relation between the recording linear velocity and the write strategy.
Figure 9B:
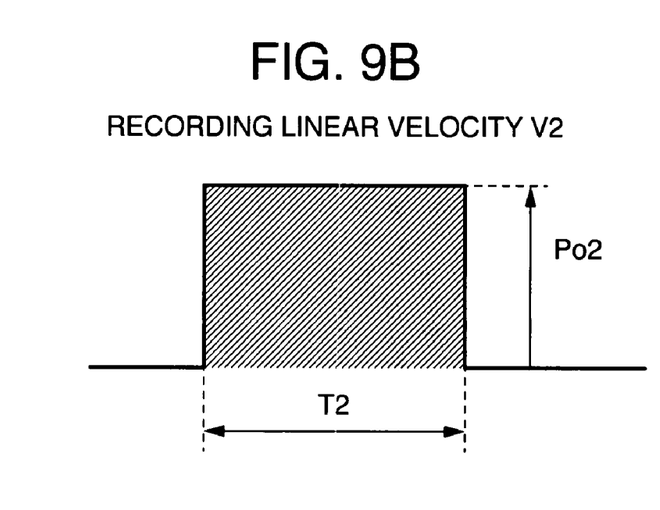

At this time, assuming that the recording power is set to Po, the recording linear velocity is set to V, and C is a constant, the power is controlled in the zone so that Po=CV. For this purpose, C is obtained by Po and V at the highest recording linear velocity in the zone where the recording is executed and power control is made in accordance with the equations. As shown in FIGS. 9A and 9B, this means that the product of a real time T (which is inversely proportional to V) of the recording pulse and the recording power Po, that is, a heat amount of the incident laser beam is constant. For example, C is obtained from the recording linear velocity 16X at 16X in FIG. 7 and the optimum recording power (43.0 mW) at which the jitter becomes minimum and the recording power at 14X is calculated, so that the power is equal to 37.6 mW and it will be understood that this value coincides with the optimum recording power at 14X.

Figure 10:
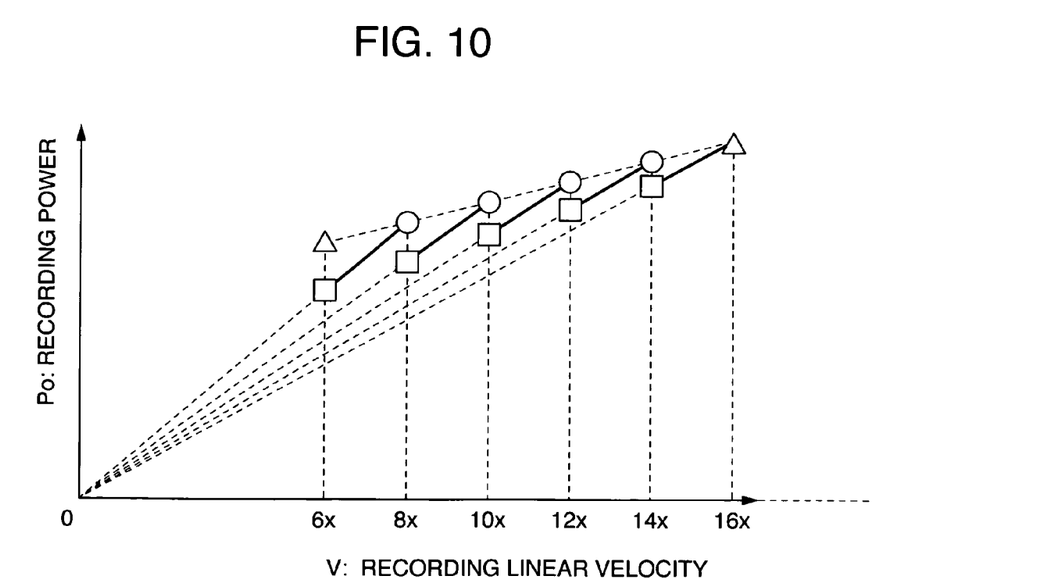
FIG. 10 shows a setting method of the recording power.

A state of controlling the recording power as mentioned above is shown in a schematic diagram of FIG. 10. In the embodiment, first, the write strategies are adjusted at the two recording linear velocities of 16X and 6X and the optimum recording power is obtained (Δ in FIG. 10). Subsequently, the recording power Po at 8X, 10X, 12X, and 14X as an intermediate recording linear velocity is obtained by the linear interpolation (□ FIG. 10). Then, C in Po=CV is calculated from the maximum recording linear velocity V in each zone and the recording power Po at this velocity. After the above processes are performed, the recording operation is performed. According to the CAV recording, since the recording linear velocity V changes also in the zone, the recording power is controlled by assuming that Po=CV. As will be also understood from Equations, this means that the recording power is controlled on the straight line (line connecting □ and ○ in each zone of FIG. 10) connecting the recording power and the origin at the highest recording linear velocity in each zone. The square mark □ in FIG. 10 represents a recording linear velocity on the innermost periphery side (low recording linear velocity side) in each zone, and exists on the straight line connecting the recording power and the origin in the highest recording velocity in each zone.

Figure 11:
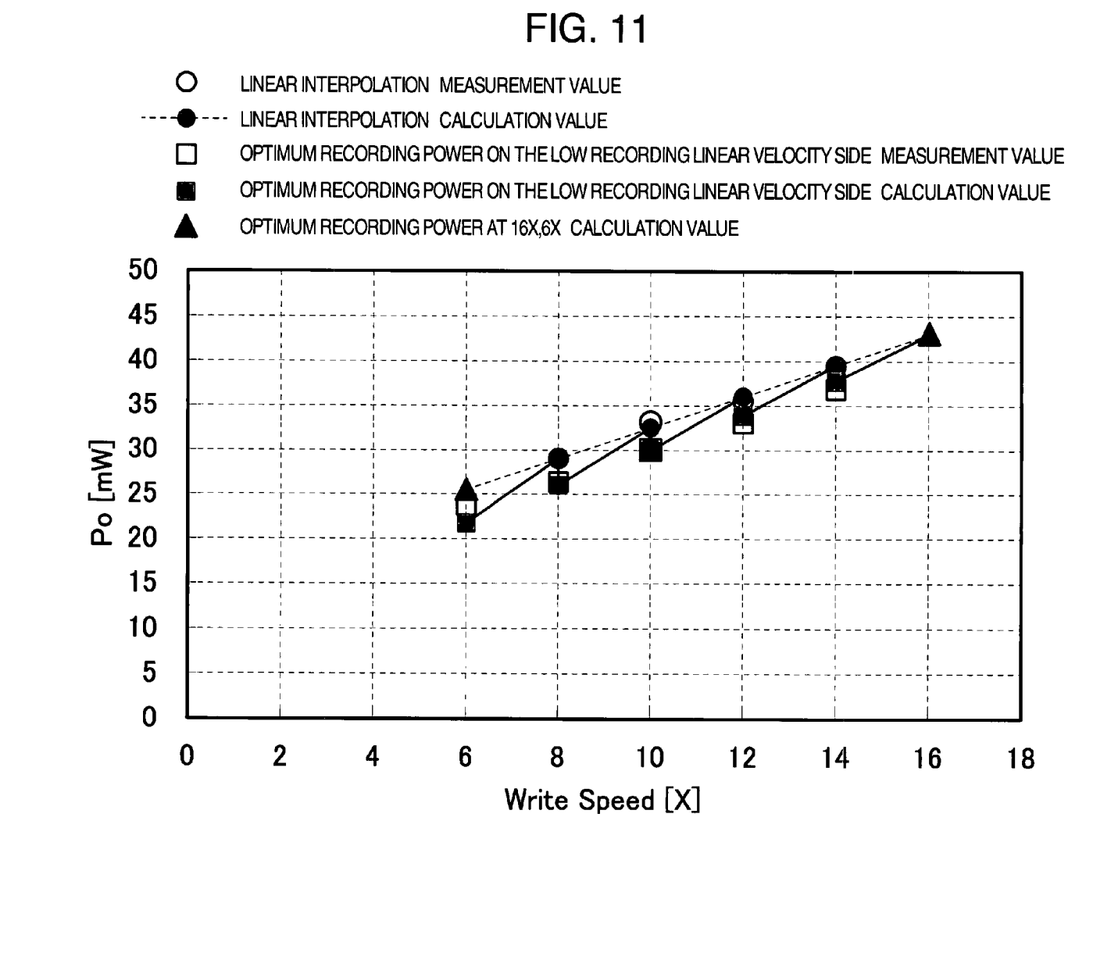
FIG. 11 shows measurement values of the recording power.

Measurement results in the case where the recording power is controlled in this manner are shown in FIG. 11. It will be understood that the calculation results and the measurement results almost coincide. Here, the marks ●, ▲, ■ in FIG. 11 correspond to the marks ○, Δ, □, in FIG. 10, respectively. The circle mark ○ in FIG. 11 represents a measurement value of recording power obtained by linear interpolation, and the square mark □ in FIG. 11 represents a measurement value of the optimum recording power on the innermost periphery side (low recording linear velocity side) obtained by the optimum recording power deciding method according to the present embodiment.

When the zone is switched, whether or not the recording is continued is discriminated (S10). If it is continued, the zone is shifted to the next zone (S11) and the operation to calculate the recording power again and set it is repeated.

Although the conditions have been obtained at the lowest recording linear velocity and the highest recording linear velocity in the embodiment, the invention is not limited to such an example but they may be inputted from the outside. For example, if a state of the disk is bad in the outer periphery trial writing region and the recording at 16X cannot be executed, it is also possible to construct in such a manner that the recording linear velocity is reduced to, for example, 12X or the like, the trial writing is executed, and the write strategy of 16X is formed from the write strategies of 6X and 12X.

Although the pulse timing has been corrected upon recording in the embodiment, it is also possible to construct in such a manner that the pulse timing is preliminarily and experimentally obtained every zone and registered into firmware of the optical disk apparatus. Even in the case of experimentally obtaining the pulse timing in this manner, the recording quality can be assured by matching the pulse timing and the PoPm ratio at the highest recording linear velocity of the zone. Thus, the quality of the reproduction signal can be improved and the reliability of the reproduction data can be improved.

Figure 12:
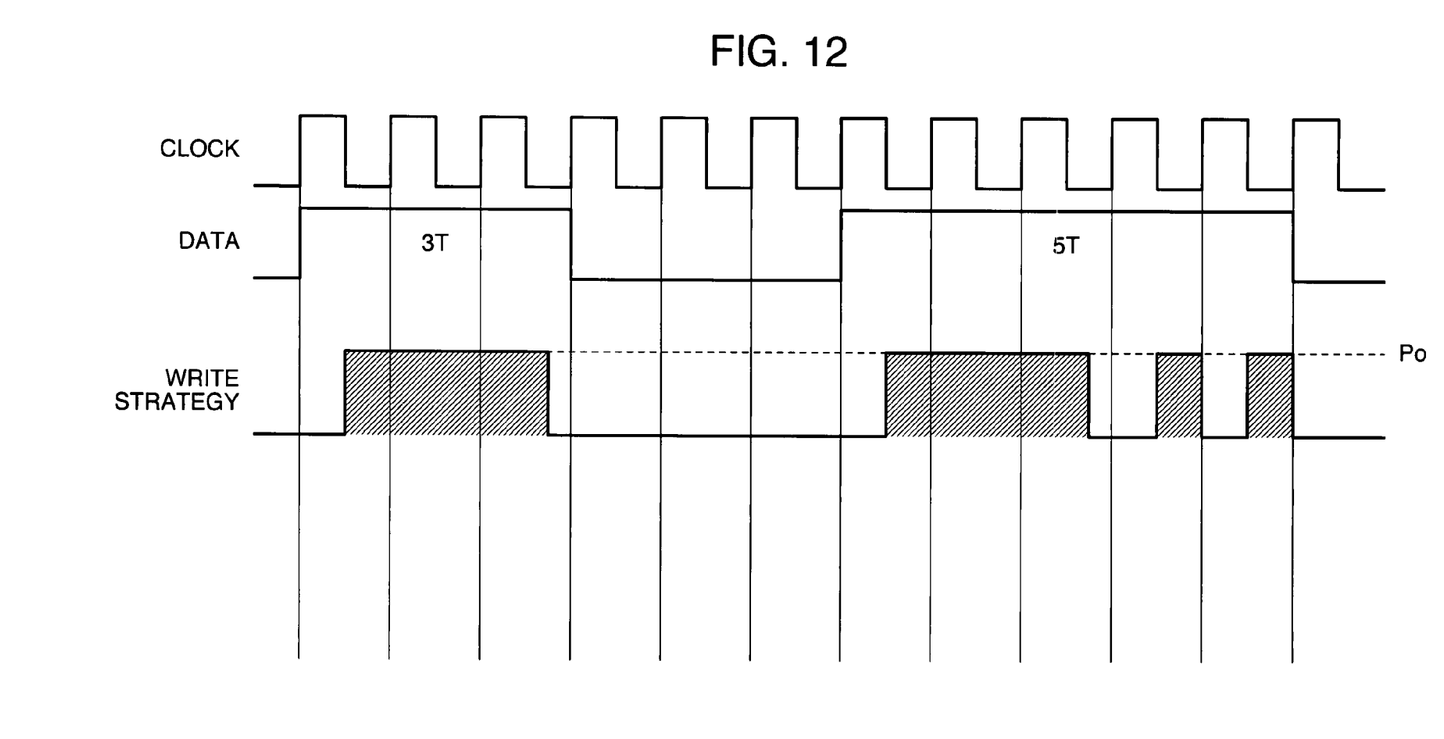
FIG. 12 shows a multi-pulse type write strategy.

Although the embodiment has been described with respect to the castle type write strategy, the invention can be also similarly applied to the case of, for example, a multi-pulse type as shown in FIG. 12.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk recording method of recording information by irradiating a laser beam on an optical disk on a basis of pulse timing according to a length of a recording mark, comprising the steps of:
    setting the pulse timing according to the length of the recording mark to be constant in a predetermined recording region of the disk; and
    optimizing said pulse timing at a highest recording linear velocity in said predetermined recording region; and where
    recording power and said pulse timing are set so that a product of said recording power and a recording pulse width set at a first recording linear velocity in a first recording region and said product of said recording power and said recording pulse width set at a second recording linear velocity in a second recording region are equal.

2. An optical disk recording method of recording information by irradiating a laser beam on an optical disk on a basis of a pulse timing according to a length of a recording mark, comprising the steps of:
    setting the pulse timing according to the length of the recording mark to be constant in a predetermined recording region; and
    optimizing pulse timing at a recording linear velocity of an outermost periphery in said recording region; and where
    recording power and said pulse timing are set so that a product of said recording power and a recording pulse width set at a first recording linear velocity in a first recording region and a product of said recording power and said recording pulse width set at a second recording linear velocity in a second recording region are equal.

3. An optical disk recording method comprising the steps of:
    dividing an optical disk into a plurality of concentric zones;
    setting pulse timing according to a length of a recording mark to be constant in each of the concentric zones;
    obtaining said pulse timing at the start of recording in each of said zones from an optimized result at a highest recording linear velocity in said zone; and
    starting said recording in said zone on a basis of recording power obtained from a trial writing result; and where
    said recording power is set for each zone so that a product of said recording power and a recording pulse width set at a first recording linear velocity in a first recording region and a product of said recording power and said recording pulse width set at a second recording linear velocity in a second recording region are equal.

4. An optical disk recording method comprising the steps of:
    dividing an optical disk into a plurality of concentric zones;
    setting a pulse timing according to a length of a recording mark to be constant in each of the concentric zones;
    obtaining said pulse timing at the start of recording in each of said zones from an optimized result at a recording linear velocity at an outermost periphery in said zone; and
    starting said recording in said zone on the basis of a recording power obtained from a trial writing result; and where
    said recording cower is set for each zone so that a product of said recording power and a recording pulse width set at a first recording linear velocity in a first recording region and a product of said recording power and said recording pulse width set at a second recording linear velocity in a second recording region are equal.

5. An optical disk apparatus comprising:
    a spindle motor for rotating an optical disk;
    a laser for recording information by irradiating a laser beam based on a write strategy constructed by recording power information and pulse timing information according to a length of a recording mark on a recording surface of said optical disk;
    means for driving said laser in accordance with said write strategy; and
    control means for controlling said spindle motor and said driving means and optimizing pulse timing according to the length of the recording mark in a recording region on said optical disk at a highest recording linear velocity in said recording region; and where
    said control means sets recording power and said pulse timing so that a product of said recording power and a recording pulse width set at a first recording linear velocity in a first recording region and said product of said recording power and said recording pulse width set at a second recording linear velocity in a second recording region are equal.

6. An optical disk apparatus comprising:
    a spindle motor for rotating an optical disk;
    a laser for recording information by irradiating a laser beam based on a write strategy constructed by recording power information and pulse timing information according to a length of a recording mark on a recording surface of said optical disk;
    means for driving said laser in accordance with said write strategy and
    control means for controlling said spindle motor and said laser driving means and, optimizing the pulse timing according to the length of the recording mark in a recording region on said optical disk at a linear recording velocity of an outermost periphery in said recording region; and where
    said control means sets recording power and said pulse timing so that a product of said recording power and a recording pulse width set at a first linear recording velocity in a first recording region and said product of said recording power and said recording pulse width set at a second linear recording velocity in a second recording region are equal.

* * * * *